United States Patent [19]

Wagner et al.

[11] Patent Number: 4,525,689

[45] Date of Patent: Jun. 25, 1985

[54] N×M STRIPLINE SWITCH

[75] Inventors: Gary L. Wagner, Menlo Park; Michael J. Serrone, Sunnyvale, both of Calif.

[73] Assignee: Ford Aerospace & Communications Corporation, Detroit, Mich.

[21] Appl. No.: 558,215

[22] Filed: Dec. 5, 1983

[51] Int. Cl.³ .............................................. H01P 1/15
[52] U.S. Cl. .................................... 333/104; 333/116; 333/128
[58] Field of Search ............... 333/101, 103, 104, 105; 179/18 GF; 340/825.79, 825.85, 825.94, 825.96, 825.89

[56] References Cited

U.S. PATENT DOCUMENTS

| | | |
|---|---|---|
| 3,337,820 | 8/1967 | Harper . |
| 3,475,700 | 10/1969 | Ertel . |
| 3,597,706 | 8/1971 | Kibler . |
| 3,711,834 | 1/1973 | Rogers .......................... 340/825.89 |
| 3,813,497 | 5/1974 | Wachs et al. . |
| 3,833,866 | 9/1974 | Boutelant . |
| 4,129,838 | 12/1978 | Wallington et al. . |
| 4,153,888 | 6/1979 | Cote . |
| 4,165,497 | 8/1979 | Irons ............................... 333/104 X |
| 4,302,734 | 11/1981 | Stockton et al. . |
| 4,316,159 | 2/1982 | Ho . |
| 4,399,439 | 8/1983 | Upadhyayula .................. 333/101 X |
| 4,443,773 | 4/1984 | Rall et al. ............................ 333/104 |

Primary Examiner—Paul Gensler
Attorney, Agent, or Firm—Edward J. Radlo; Robert D. Sanborn

[57] ABSTRACT

A dynamic electronic switch (10) having n inputs (2) and m outputs (4), where n and m are any positive integers. The electromagnetic signal on any given input (2) may be switched onto any number of outputs (4), but any given output (4) may have no more than one input signal switched thereonto at any given time. Switching nodes (8), comprising at least one switching diode (11, 13, 15) and a directional edge coupler (17) embedded between two parallel ground planes (9, 1) in a planar mother board (5), perform switching at each intersection of an input (2) and an output (4). Each output (4) is mounted on a planar dielectric summer board (6) positioned orthogonal to the mother board (5). The lengths of the extended transmission lines (76) associated with each output (4) are such that when an input signal is switched onto said output (4), the sum of the admittances of the n−1 unswitched extended transmission lines (76), measured between an associated summing junction (85) and ground, is substantially equal to zero.

4 Claims, 2 Drawing Figures

N×M STRIPLINE SWITCH

DESCRIPTION

1. Technical Field

This invention pertains to the field of dynamic electronic switches having n stripline inputs and m transmission line outputs.

2. Background Art

U.S. Pat. Nos. 3,813,497 and 4,316,159 each discloses an n×m switch in which each switching node comprises switching diodes not embedded between ground planes and at least two directional couplers, one each on the input and output sides of each node. The present invention, on the other hand, is an n×m switch which embeds its switching diodes, directional couplers, and inputs themselves between two parallel ground planes, resulting in much greater isolation than the referenced patents. Furthermore, the switch of the present invention uses just one directional coupler at each switching node; the directional coupler used by the referenced patents on the output side of each node is replaced by a summing network comprising a summing junction and a set of n transmission lines corresponding to the n inputs. The lengths of the transmission lines, including their extensions onto the switching nodes, are such that as each input is selected, the total admittance presented to the summing junction by the nonselected transmission lines is substantially equal to zero. This prevents the output signal from being attenuated or distorted, while imposing the condition, not present in the referenced patents, that no output can have switched thereonto more than one input signal simultaneously, and offers the following advantages over the cited references: significant reduction of insertion loss, simpler fabrication, and economy in using PC board space.

U.S. Pat. No. 3,337,820 discloses a switch in which one input can be switched to one output. Thus, it is not an n×m switch as in the present invention. The referenced patent further does not use directional couplers in combination with diodes as in the present invention.

U.S. Pat. No. 3,475,700 switches one input to one of two outputs. It does not use couplers as part of switching nodes.

U.S. Pat. No. 3,597,706 discloses a switch in which one input can be switched to one of several outputs. The single diodes in each leg of the switch and associated transmission lines form a monolithic structure, which would not be economical to manufacture in small quantities.

U.S. Pat. No. 3,833,866 is a complex assembly differing from the switch of the present invention in that it does not use couplers at all, and that switching to more than one output at a time causes a drop in the output power which varies dramatically depending upon the number of outputs selected.

U.S. Pat. No. 4,129,838 discloses a four port switching device which switches one or both of two inputs to one or both of two outputs.

U.S. Pat. No. 4,153,888 is a bulky single pole airline switch using many machined parts, having an objective of low loss. Low loss is not a primary design goal of the instant invention, which features exceptionally high values of isolation at high speed.

U.S. Pat. No. 4,302,734 discloses a single pole switch not using directional couplers, not using microstrip or stripline, and not equalizing output admittances.

None of U.S. Pat. Nos. 3,337,820; 3,475,700; 3,597,706; 3,833,866; 4,129,838; 4,153,888; and 4,302,734 discloses switching nodes comprising diodes in planar combination with directional couplers as in the present invention. Compared with these patents, the present invention offers the following advantages: an improved on/off power ratio; an improved reverse (current) isolation; the activation of the switch does not change the voltage standing wave ratio on the input signals; and any number of outputs may be extracted from each input signal. The added insertion loss of the instant switch is acceptable for many applications.

DISCLOSURE OF INVENTION

The present invention is an electronic switch (10) having n stripline inputs (2) and m transmission line outputs (4). n and m can be any positive integers. An electromagnetic signal on any one of the inputs (2) can be switched onto any number of outputs (4) by means of a switching node (8) interposed at the intersection of each input (2) and each output (4). On the other hand, no output (4) can have more than one input signal switched thereonto simultaneously. The switch (10) is particularly suitable in a frequency hopping synthesizer which very rapidly, and with a high degree of isolation, switches each of n input signals onto up to m outputs (4).

All the switching nodes (8) are embedded between ground planes (9, 1) in a single planar mother board (5). Each node (8) comprises at least one switching diode (11, 13, 15) and an edge coupler (17). The activation of a d.c. control current applied at a control point (60) associated with each switching node (8) switches on the diodes (11, 13, 15) of that node (8).

Each coupler (17) couples off just a small portion of the energy from the signal traveling along the given input (2) through the associated switching node (8), when it is activated.

Each of the outputs (4) is mounted onto one of m planar dielectric summer boards (6), each of which is orthogonal to the mother board (5).

Each summer board (6) further comprises n transmission lines (75), each mounted onto the board (6) and each coupling, via a summing junction (85), a different one of the n inputs (2) with the associated output (4). The n extended transmission lines (76) (each comprising line (75) and associated node (8) elements (16, 35, 37, 38)) have lengths such that when one of the input signals is switched onto the associated output (4), the sum of the admittances of the unswitched n−1 extended transmission lines (76), measured between the summing junction (85) and ground, is substantially equal to zero.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
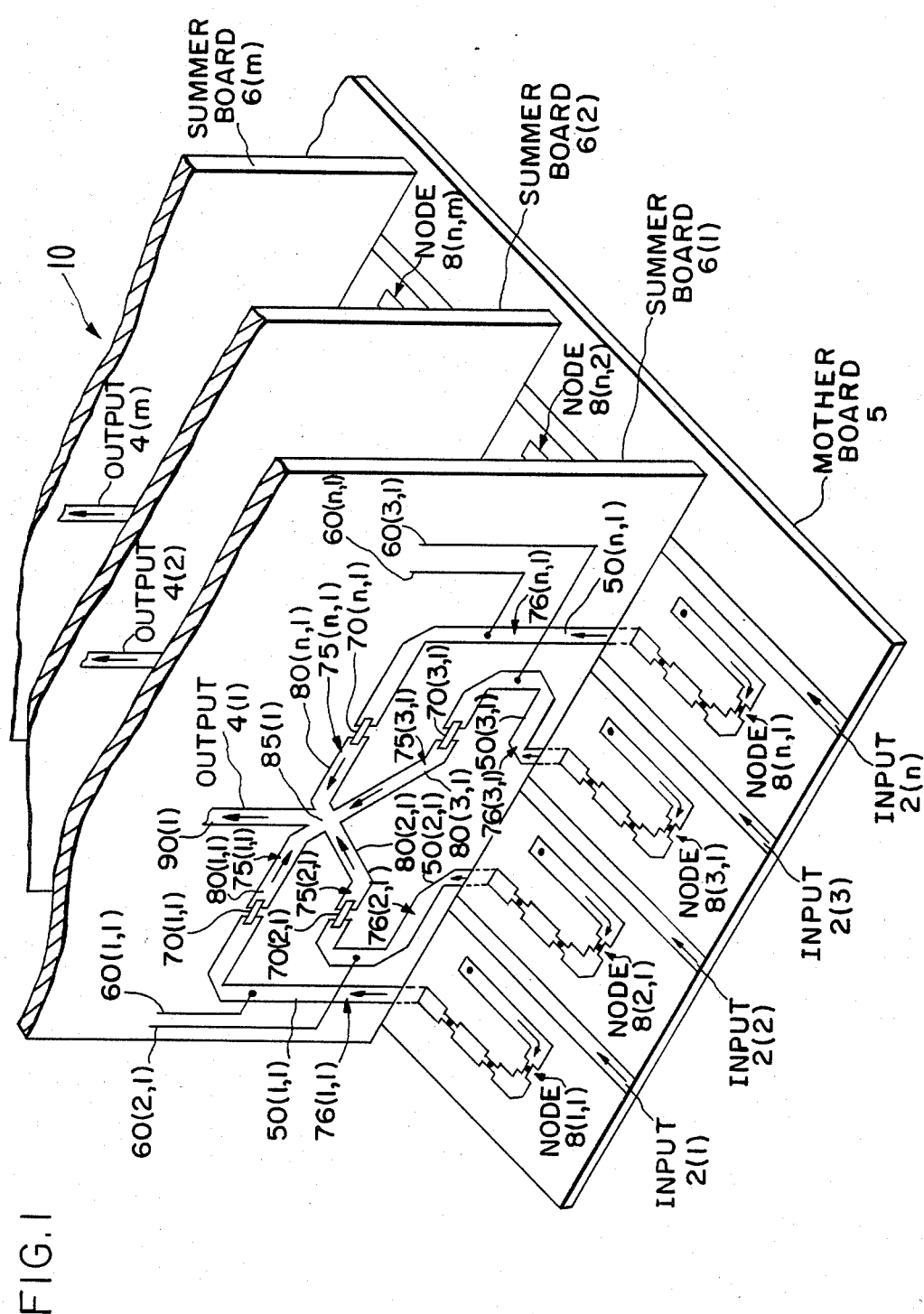
FIG. 1 is a perspective view of a preferred embodiment of the switch (10) of the present invention in which four inputs (2) and three outputs (4) are employed.

Switch 10 has n inputs 2 and m outputs 4. FIG 1 illustrates an embodiment in which n is 4 and m is 3; however, n and m can be any positive integers. An input signal may be conveyed over each of the inputs 2. The input signals can have different frequencies but are typically within the same microwave (i.e., greater than 1 GHz) frequency band. Each of the m outputs 4 is mounted onto a flat dielectric summer board 6. Each board 6 is orthogonal to mother board 5.

The inputs 2 and conductors 19, 18, 16, 31, 33, 35 comprising nodes 8 are implemented in stripline, i.e., microstrip conductors sandwiched between two ground planes, in this case ground planes 9 and 1. Stripline is used because it desirably enhances isolation, one of the primary design goals of switch 10. The (output) transmission lines 75 on the summer boards 6 can be any transmission line media, e.g., microstrip, stripline, or coaxial cable. When lines 75 are microstrip or stripline, they preferably have the same thickness and width as the (input) conductors 2, 19 embedded within mother board 5, to maintain a constant characteristic impedance.

There is one switching node 8 at the intersection of each input 2 and each output 4. Thus, there are nm nodes 8. Each node 8 is embedded between the ground planes 9, 1 within mother board 5. FIG. 1 shows, by means of arrows, an embodiment in which the input signals are introduced into inputs 2 at the lower left side of the Figure. However, if the orientations of all the directional couplers 17 are reversed, then the switch 10 could still be used as an n×m switch by means of introducing the input signals to the inputs 2 from the upper right of the Figure.

The input signal traveling along any given input 2 may be switched onto any number of outputs 4. Each directional edge coupler 17 (see FIG. 2) has been designed so that just a small amount of the power is siphoned off the signal (if any) traveling along the associated input 2 as the associated switching node 8 is activated, so that sufficient power will remain in the input 2 signal for possible switching onto subsequent outputs 4.

Each summer board 6 comprises an output 4 for conveying the input signal, if any, switched thereonto. Each output 4 is fed by a summing junction 85, which in turn is fed by a set of n transmission lines 75. Each line 75 is associated with one input 2, and comprises a first segment 50, a d.c. blocking capacitor 70, and a second segment 80 which couples the capacitor 70 with the summing junction 85. Individual d.c. control currents 60 are selectively and dynamically applied, e.g., by computer control means (not illustrated), to each first segment 50 in order to selectively activate the switching diodes 11, 13, 15 associated with that line 75. Each capacitor 70 blocks the associated d.c. control current from the output 4.

In order to minimize impedance mismatches at each summing junction 85, the associated n extended transmission lines 76 have lengths such that when one of the input signals is switched to the given output 4, the sum of the admittances of the n−1 unswitched extended transmission lines 76, measured between the midpoint of the given summing junction 85 and ground, is as close to zero as possible. By extended transmission line 76 is meant all elements between summing junction 85 and the nearest diode 15. Thus, each extended transmission line 76 comprises a segment 80, a capacitor 70, a segment 50, a pad 37, a conductor 38, a pad 35, and a narrow probe 16. In general, we want the length of each extended transmission line 76 to be roughly one-half wavelength, because a half wavelength transmission line transforms an open circuit to an open circuit.

The combination of summing junction 85 and the extended transmission lines 76 discourages more than one input signal from being switched onto the associated output 4 simultaneously: attempting to so switch multiple input signals would pollute the input signals and cause an impedance mismatch at the summing junction 85.

The substantial zeroing of the unswitched admittances prevents the output 4 signal from being attenuated or distorted by the operation of the switch 10, and is accomplished by adhering to the following procedure, in which Y is the admittance of an extended transmission line 76, L is the length of an extended transmission line 76, F is the frequency of an input signal appearing at an input 2, and the index i has each of the values 1, 2, 3, and 4.

Let us define a set of pseudo frequencies $f(i) \equiv v/L(i)$, where v is the velocity of the electromagnetic signal in extended transmission line 76 taking into account the presence of the dielectric 7, 3, 6. By definition, $$Y(i) = jY_0 \tan(2\pi f/f(i))$$

where $Y_0$ is the characteristic admittance of each extended transmission line 76 and f is the frequency of the signal present in line 76.

Expanding tan about $\pi$:

$$\tan(2\pi f/f(i)) = \tan(\pi(2f/f(i)-1)+\pi) = \tan(\pi(2f/f(i)-1)) \simeq \pi(2f/f(i)-1)$$

This last expression is known as the "small angle approximation", and is valid here because, as stated previously, $$L(i) \simeq \lambda_\epsilon/2 \rightarrow f \simeq f(i)/2 \rightarrow 2\pi f/f(i) \simeq \pi$$

where $\lambda_\epsilon$ is the wavelength of the signal in line 76 taking into account the presence of the dielectric 7, 3, 6.

The desired condition concerning zeroing of admittances can be written:

$$\sum_{i \neq j} Y(i) = 0$$

for j=1, 2, 3, 4, where input 2(j) is the one that is switched. Thus, we have four simultaneous equations in four unknowns. Expanding each of these equations, using the above expression for Y(i) and the above small angle approximation, we have:

$$1.5/F(1) = 1/f(2) + 1/f(3) + 1/f(4)$$

$$1.5F(2) = 1/f(1) + 1/f(3) + 1/f(4)$$

$$1.5/F(3) = 1/f(1) + 1/f(2) + 1/f(4)$$

$$1.5/F(4) = 1/f(1) + 1/f(2) + 1/f(3)$$

or, 105

$$\begin{bmatrix} 1/F(1) \\ 1/F(2) \\ 1/F(3) \\ 1/F(4) \end{bmatrix} = \begin{bmatrix} 0 & 1 & 1 & 1 \\ 1 & 0 & 1 & 1 \\ 1 & 1 & 0 & 1 \\ 1 & 1 & 1 & 0 \end{bmatrix} \begin{bmatrix} 1/f(1) \\ 1/f(2) \\ 1/f(3) \\ 1/f(4) \end{bmatrix}$$

The inverse of the above 4×4 matrix can be written as:

$$\begin{bmatrix} 0 & 1 & 1 & 1 \\ 1 & 0 & 1 & 1 \\ 1 & 1 & 0 & 1 \\ 1 & 1 & 1 & 0 \end{bmatrix}^{-1} = 1/3 \begin{bmatrix} -2 & 1 & 1 & 1 \\ 1 & -2 & 1 & 1 \\ 1 & 1 & -2 & 1 \\ 1 & 1 & 1 & -2 \end{bmatrix}$$

Therefore, $$\begin{bmatrix} 1/f(1) \\ 1/f(2) \\ 1/f(3) \\ 1/f(4) \end{bmatrix} = 1/2 \begin{bmatrix} -2 & 1 & 1 & 1 \\ 1 & -2 & 1 & 1 \\ 1 & 1 & -2 & 1 \\ 1 & 1 & 1 & -2 \end{bmatrix} \begin{bmatrix} 1/F(1) \\ 1/F(2) \\ 1/F(3) \\ 1/F(4) \end{bmatrix}$$

Let us assume that our four input frequencies are fixed and given as follows:
F(1)=1.25 GHz
F(2)=1.3125 GHz
F(3)=1.375 GHz
F(4)=1.4375 GHz
Then we can solve for each f(i) as follows:
f(1)=3.4198 GHz
f(2)=2.8608 GHz
f(3)=2.4906 GHz
f(4)=2.2275 GHz
and we therefore obtain each L(i) as follows:
L(1)=1.84 inches
L(2)=2.20 inches
L(3)=2.52 inches, and
L(4)=2.82 inches,
given an effective dielectric constant of 3.53. It will be appreciated that a number of geometrical configurations can accommodate the above lengths. The substantial zeroing of the admittances using the above small angle approximation has been shown to give excellent results.

Figure 2:
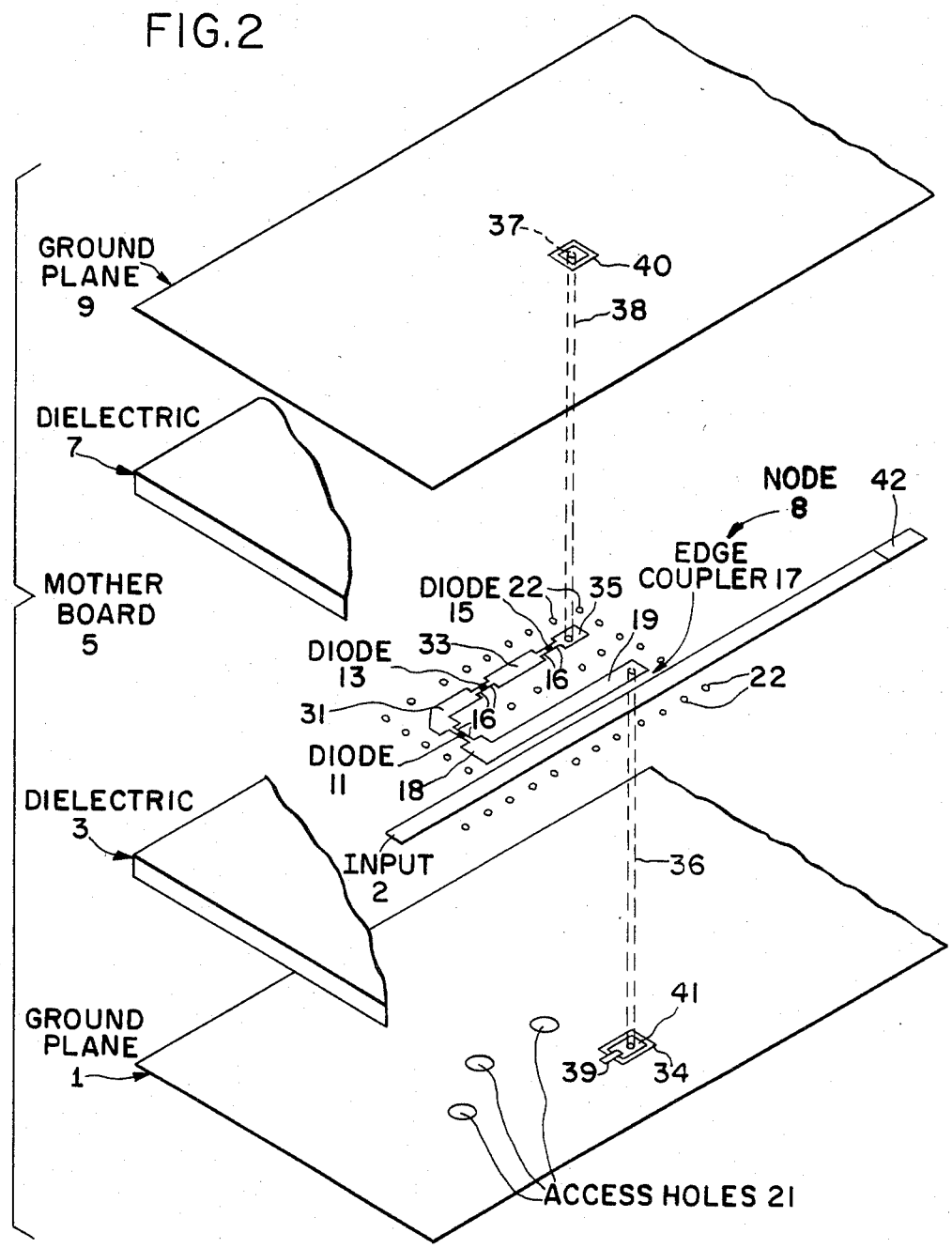
FIG. 2 is a broken-away perspective view of part of the mother board (5) of the present invention, showing details of one of the switching nodes (8).

Turning to FIG. 2, it is seen that mother board 5 is a sandwich comprising conductive upper ground plane 9; planar dielectric 7 (most of which has been broken away for clarity); a trace plane containing the microstrip conductive elements of node 8; planar dielectric 3 (most of which has been broken away for clarity); and conductive lower ground plane 1. Embedding switching nodes 8 within ground planes 9 and 1 desirably enhances the isolation of switch 10. In an embodiment that has been built for input signal frequencies in the region between 1 GHz and 2 GHz, the on/off power ratio of each switching node 8 was 70 dB. In other words, at each output 4, each unswitched input signal was measured to be 70 dB below any given switched input signal. Isolation between adjacent inputs 2 was measured to be 90 dB.

Dielectric layers 7 and 3 typically have the same width and same dielectric constant, to preserve modal symmetry. The microstrip conductive elements of node 8 may be fabricated by any microstrip technique, e.g., acid etching a continuous sheet of copper. All conductive elements in switch 10 are dimensioned for a single characteristic impedance, typically 50 ohms (which makes for convenient microstrip dimensions). For microstrip, suitable dimensions yielding this characteristic impedance are a thickness of 1.35 mils and a width of approximately 100 mils.

Directional edge coupler 17 comprises quarter wavelength section 19 and a portion of input 2 adjacent and parallel thereto. Section 19 has the same width as input 2. In the working embodiment, the coupling ratio of each edge coupler 17 associated with the first output 4(1) was about 16 dB; section 19 was spaced apart from input 2 accordingly. The coupling ratios of the couplers 17 associated with subsequent outputs 4 were adjusted slightly to maintain a constant power level at each output 4. In other respects, the nodes 8 were identical.

Input 2 terminates in a matched load 42. Coupler 17 must be terminated to ground via the common characteristic impedance, to properly terminate coupler 17 and provide a d.c. path to ground for the current activating diodes 11, 13, 15. Thus, conductor 36, which may be a wire or a plated-through hole through dielectric 3, connects a first end of section 19 with lower ground plane 1 via chip resistor 39 having the characteristic impedance. Pad 41 is a planar conductor facilitating the connection of conductor 36 to resistor 39. Gap 34 is an air gap or other dielectric spacing between pad 41 and lower ground plane 1. An electrically conductive shield (not illustrated) may be mounted beneath lower ground plane 1 in the region of pad 41 and resistor 39 to assist in desirably containing the electromagnetic energy within the confines of mother board 5.

Section 19 is bent at its second end at a right angle to form an orthogonal portion 18, so that the switching region of node 8 is separated from its coupling region. At least one switching element must be used. In this case, three diodes 11, 13, 15 are used as the switching elements, to enhance the isolation. The diodes 11, 13, 15 are separated by two conductive separators, 31 and 33, each of which is between ⅛ of a wavelength and ¼ of a wavelength long. The purpose of separators 31, 33 is to improve the isolation between the diodes 11, 13, 15. The conductive elements at the remote ends of the diode chain (pad 35 and orthogonal portion 18) do not have to be any particular length; orthogonal portion 18 can in fact have zero length.

Diodes 11, 13, 15 are connected to orthogonal portion 18 and separator 31, separators 31 and 33, and separator 33 and pad 35, respectively, via narrow probes 16 which prevent unwanted edge coupling between elements 18 and 31, 31 and 33, and 33 and 35, respectively. Because of the presence of narrow probes 16, conductors 18, 31, 33, and 35 must be a little bit wider than they would normally be, in order to maintain the characteristic impedance.

One of the separators, in this case separator 31, may optionally be bent, in this case at a 90° angle, to enhance the compactness of node 8. Thus, more inputs 2 may be fitted onto a mother board 5 of a given width.

An access hole 21 is formed through lower ground plane 1 beneath each diode 11, 13, 15. The purpose of holes 21 is to enable the placement of the diodes 11, 13, 15 into the switch 10 as the last fabrication step (this being desirable due to the delicacy of the diodes 11, 13, 15), and to facilitate the repair of the diodes 11, 13, 15 subsequent to fabrication. Conductive end caps (not illustrated) are soldered over the holes 21 on the underside of lower ground plane 1 for shielding purposes.

A series of conductive mode suppressor pins 22 surrounds the conductive microstrip elements of node 8.

Pins 22, which may be wires or plated-through holes formed in dielectric layers 7, 3, connect ground planes 9 and 1, tending to equalize the potential therebetween, and thus minimize the VSWR. Pins 22 are closely spaced, typically less than $\frac{1}{8}$ of a wavelength apart, to suppress modes, and thus enhance isolation. Pins 22 are not shown other than on the trace plane of node 8, to avoid cluttering FIG. 2.

Conductive pad 35 defines the end of the diode chain and facilitates the removal of the switched signal away from the trace plane of node 8 and onto the board 6 of the associated output 4. In the embodiment illustrated, conductor 38, a wire or plated-through hole through dielectric 7, connects pad 35 with pad 37, which in turn connects with the corresponding transmission line segment 50 in a manner avoiding impedance mismatch. Gap 40 is an air or other dielectric spacing between pad 37 and ground plane 9.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An n by m switch for selectively switching n electromagnetic input signals onto m outputs, comprising:

n electrically conductive inputs, each of which may convey an input signal, where n is a positive integer;

m electrically conductive outputs, each of which may convey no more than one of the input signals, where m is a positive integer; wherein each input is coupled to each output via a switching node that permits the associated input signal to be switched onto the associated output, depending upon the activation of a d.c. control current applied to each switching node; and each input can be simultaneously switched onto any number of outputs;

wherein each output comprises an output transmission line, n connection transmission lines each having first and second ends, and a summation junction comprising the common intersection of the n connection transmission lines and the output transmission line, the first ends of the connection transmission lines being respectively connected to that output's n switching nodes corresponding to the n inputs, and the second end of each connection transmission line being connected to the summation junction; wherein the n connection transmission lines have lengths such that, when one of the input signals is switched onto said output, the sum of the admittances of the unswitched n−1 connection transmission lines, measured between the summation junction and ground, is substantially equal to zero.

2. The switch of claim 1 further comprising a planar mother board comprising a trace plane and a pair of planar dielectric layers sandwiching the trace plane, said dielectric layers themselves sandwiched by two ground planes; wherein each switching node comprises at least one switching diode lying in the trace plane, said diode enabling the transfer of power from the associated input to the associated output in response to the activation of the d.c. control current.

3. The switch of claim 2 wherein each switching node further comprises a single directional stripline edge coupler lying in the trace plane, wherein each coupler diverts just a small portion of the power from a given input signal off the associated input and through the associated switching node when activated.

4. The switch of claim 2 wherein all of the inputs lie in the trace plane and are thus embedded between the two ground planes.

* * * * *